United States Patent Office 2,752,796
Patented July 3, 1956

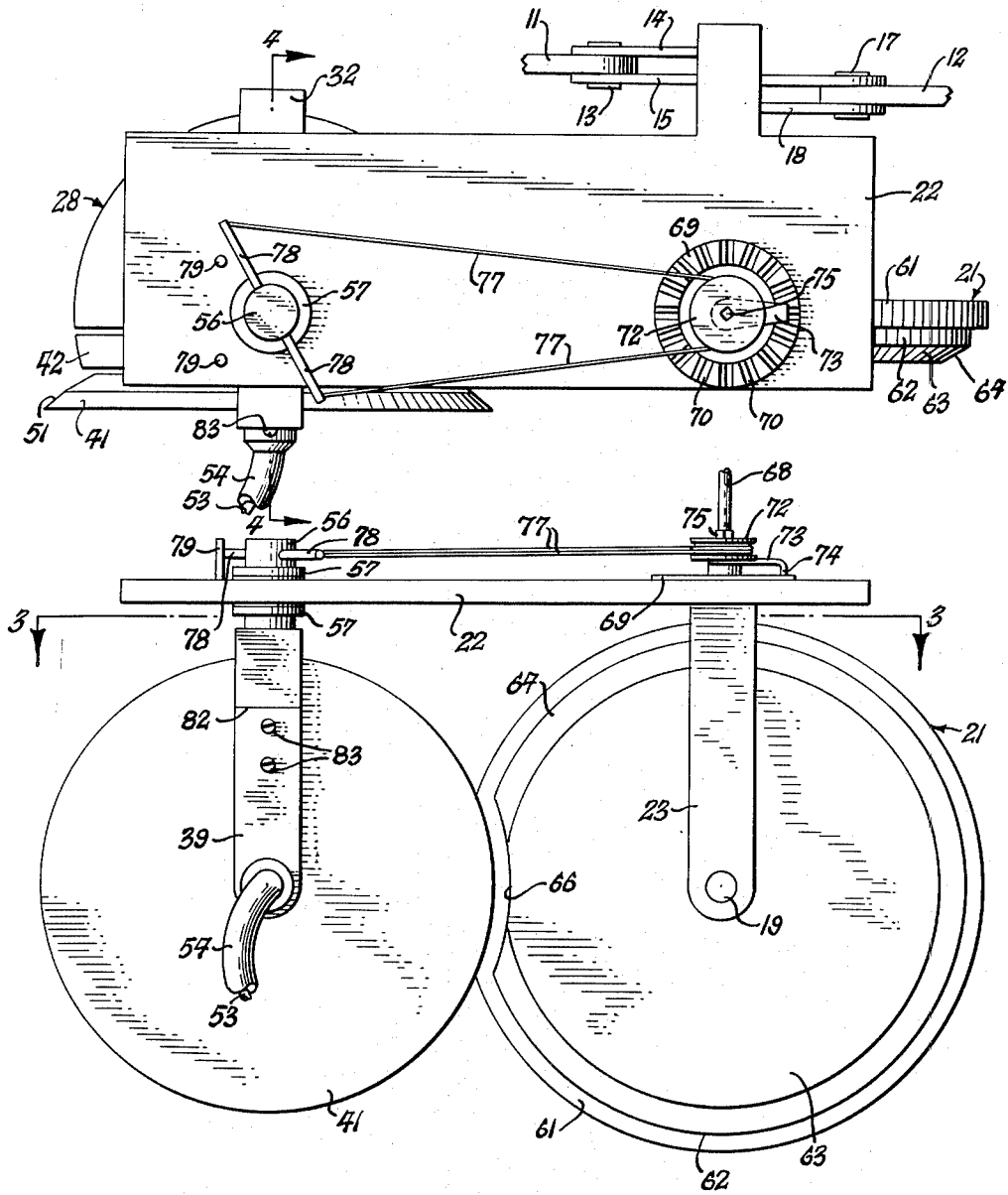

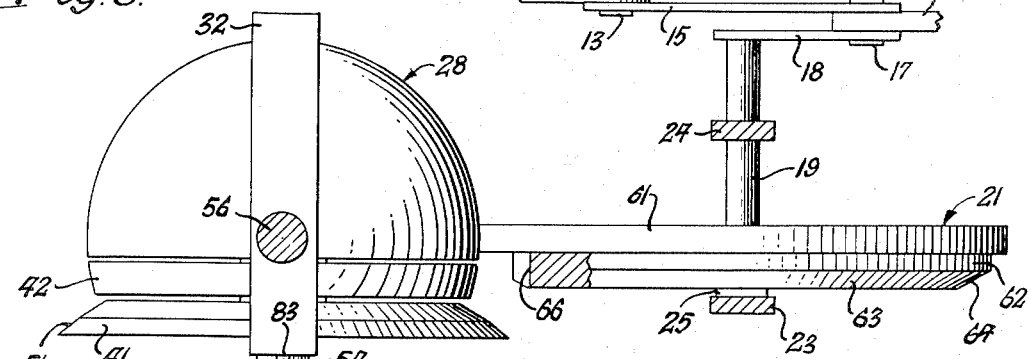
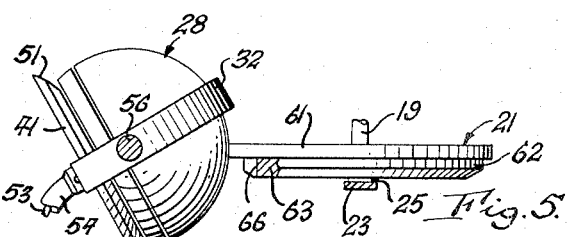
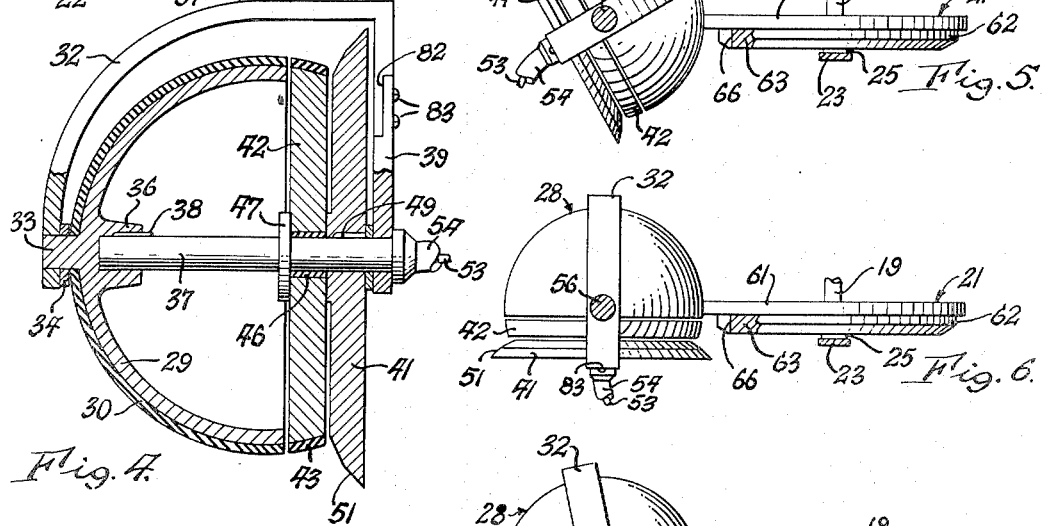
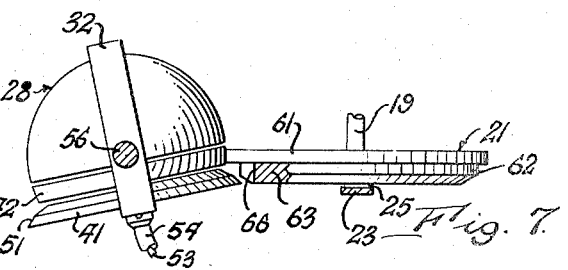
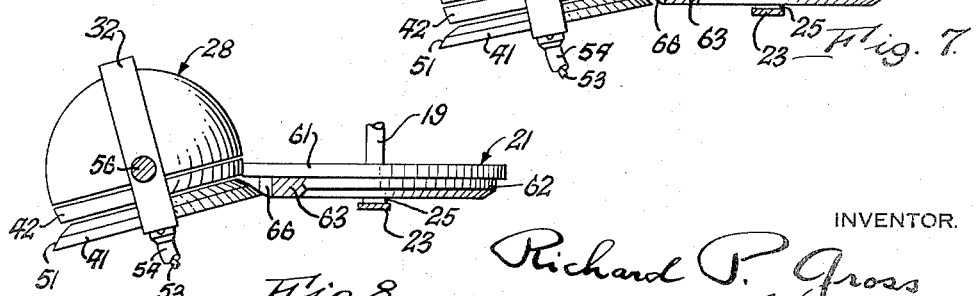

2,752,796

OPERATING MECHANISMS FOR WINDSHIELD WIPERS

Richard P. Gross, Buffalo, N. Y.

Application September 8, 1952, Serial No. 308,495

6 Claims. (Cl. 74—75)

This invention relates to operating mechanisms for windshield wipers and is particularly concerned with a mechanism for driving windshield wipers of the type used on automobiles mechanically rather than pneumatically or electrically.

It is an object of the present invention to provide simple and convenient means for driving one or more such windshield wipers by mechanical connections to a source of power.

Another object of the invention is to provide a mechanically driven windshield wiper operating mechanism which is capable of adjustment to permit the operation of the wiper blades at various speeds.

A further object of the invention is to provide a windshield wiper operating mechanism of the type described in which the speed of the wiper blades may be adjusted without changing the speed of the power source.

A still further object of the invention is to provide a windshield wiper operating mechanism of the type described in which there is means for continuously varying the speed of the wiper blades.

Another object of the invention is to provide a windshield wiper operating mechanism of the type described which is equipped with means for interrupting the motion of the wiper arms.

Still another object of the invention is to provide windshield wiper driving mechanism of the type described which is equipped with means for positioning the wiper blades in inoperative position.

A further object of the invention is to provide a windshield wiper operating mechanism of the type described which is compact and durably constructed.

Other objects and advantages of the invention will be perceived from the following specification taken in conjunction with the drawings in which:

Figure 1 is a front elevation of an embodiment of the present invention;

Figure 2 is a bottom plan view of the mechanism shown in Figure 1;

Figure 3 is a vertical sectional view on line 3—3 of Figure 2;

Figure 4 is a vertical sectional view on line 4—4 of Figure 1 showing the details of construction of the speed changing device;

Figures 5, 6, 7 and 8 are reduced views similar to Figure 3 in each of which the speed changing elements occupy different relative positions; in Figure 5 the speed of the wiper arms is relatively slow; in Figure 6 the speed of the wiper arms is relatively fast; in Figure 7 the wiper arms are free to move but are not driven; and in Figure 8 the wiper arms are positioned in inoperative position.

Referring now to Figures 1 and 3, the reference characters 11 and 12 designate actuating rods for the wiper arms (not shown) of a windshield wiper, the rods being operatively attached to the wiper arms in any suitable manner. The end of the rod 11 which is shown in the drawings is rotatably mounted on a crank pin 13 that joins crank arms 14 and 15. The visible end of the actuating rod 12 is similarly mounted on the crank pin 17 that joins crank arms 15 and 18. A crank shaft 19 which carries the crank arms and crank pins above referred to is non-rotatably attached in any suitable manner to a wheel generally designated by the reference character 21 that is adapted to be driven by means hereinafter described from any suitable source of power. The crank shaft 19 is supported from a mounting plate 22, the ends of the crank shaft being rotatably journalled in arms 23 which project outwardly from the plate 22. A third arm 24 substantially parallel to the arms 23 is also provided and rotatably supports the crank shaft 19 intermediate its ends. Washers 25 are carried by the crankshaft 19 between the crank arm 14 and one supporting arm 23 and between the wheel 21 and the other arm 23.

As best shown in Figure 3, the wheel 21 is the driven member of a variable speed drive, the driving member of which is a rotatable, substantially hemispherical body designated generally by the reference character 28. The body 28 preferably comprises a metal shell 29 having secured on the outer face thereof a layer 30 of rubber and is adapted to be rotated about an axis that extends through the center of the closed end thereof. A bracket 32 supports the body 28 for such rotation. The closed end of the hemispherical body 28 is provided with an outwardly extending axially arranged stub shaft 33 adapted to be rotatably received in a hole in one end of the bracket 32, a washer 34 being mounted on the shaft 33 between the body 28 and the bracket. In the interior of the hemispherical driving body 28 there is preferably provided a hollow boss 36 axially aligned with the stub shaft 33 and adapted to receive one end of a driving shaft 37 which may be secured therein against rotation by a key 38. The other end of the drive shaft 37 is rotatably supported in the arm 39 of the bracket 32. The drive shaft 37 also carries a parking wheel 41 which is spaced axially thereon from the body 28 and an idling wheel 42 between the body 28 and parking wheel 41. The idling wheel, which revolves freely on the drive shaft 37, is preferably provided with a facing 43 of rubber and a central bearing 46 and is held slightly spaced from the driving body 28 by a collar 47 mounted on the shaft 37. The outer surface of the facing 43 is curved with the same radius of curvature as the outside of the body 28. The parking wheel 41 is fixed to the shaft 37 by suitable means such as a key 49 and is provided with a bevelled peripheral face 51.

The drive shaft 37 together with the driving body 28 and the parking wheel 41 which are keyed thereto are adapted to be rotated by a flexible shaft 53 one end of which is connected thereto. The flexible shaft 53 is carried in a casing 54 and has its other end connected to any convenient and suitable source of power. Thus, for example, the shaft 53 may be rotated by a power take-off connected to the generator shaft of an automobile engine, or by a pulley running in contact with the fan belt. It will be evident, however, that any source of power can be used to turn the shaft 53 and accordingly an electric or pneumatic motor may be employed if desired.

Extending outwardly from the bracket 32 which supports the rotatable driving body 28 is a shaft 56, the axis of which is at right angles to that of the drive shaft 37 and lies in a plane passing through a diameter of the driving body 28. The bracket 32 is rotatably mounted by the shaft 56 in a suitable hole in the mounting plate 22, collars 57 suitably secured to the shaft holding the shaft in place with its outer end extending through the plate 22.

As most clearly shown in Figures 2 and 3, the periphery of the wheel 21 is stepped, the peripheral faces of the portion 61 of largest diameter and the adjoining portion 62 of smaller diameter being parallel to the axis of the wheel while the third portion 63 has its peripheral face 64 sloping inwardly. The portions 62 and 63 are cut away on their peripheries to form a groove 66 that has a radius of curvature which is preferably slightly greater than that of the parking wheel 41. The mountings of the driving body 28 and the wheel 21 are so spaced that the peripheral face of the portion 61 of the wheel 21 may contact the hemispherical surface of the driving body 28 in most positions of the latter. Consequently the wheel 21 will be rotated when the driving body 28 is rotated. The speed with which the wheel 21 is rotated will, however, depend upon the angular position of the drive shaft 37 with respect to the wheel 21 since that position determines the portion of the hemispherical driving body 28 with which the peripheral face of the wheel portion 61 is in contact and thus fixes the ratio of revolutions of the driving body to a revolution of the wheel 21.

The manner in which the driving body 28, the parking wheel 41 and the idling wheel 42 cooperate with the wheel 21 is shown in Figures 5 to 8, inclusive. In Figure 5 the axis of rotation of the driving body 28 is turned so that the contact of the rim of the portion 61 of wheel 21 is near one end of the axis of the driving body 28. Consequently, since the effective radius of the driving body is small as compared to that of the wheel 21, the rotation of the wheel is relatively slow. However, as the axis of rotation of the body 28 is turned until, as shown in Figure 6, it is parallel to the axis of rotation of the wheel 21, the speed of the wheel 21 increases since the effective radius of the driving body 28 and the peripheral speed of the portion thereof with which the cylindrical portion 61 is in contact are greater. Thus, by merely changing the angle of the axis of rotation of the body 28 the rate of rotation of the wheel 21 and the speed of the wipers operatively connected thereto may be gradually and continuously increased or decreased.

Figure 7 shows a position of the drive shaft 37 in which the rim of the portion 61 of the wheel 21 is in contact with the idling wheel 42 instead of with the driving body 28. Since the wheel 42 is freely rotatable on the shaft 37 there is no positive drive of the wiper arms although they are free to move. Thus, the position of the wipers may be easily shifted to permit cleaning of the windshield or replacement of wiper blades even while the engine is running and the driving body is rotating.

In Figure 8 the rotational axis of the driving body 28, parking wheel 41, and idling wheel 42 is shifted to an angular position in which the bevelled face 51 of the parking wheel 41 can engage the portion 63 of the wheel 21 which also has a bevelled face 64. Rotation of the drive shaft 37 then causes rotation of the wheel 21 until the groove 66 reaches the point of contact. Rotary movement of the wheel 21 then ceases and the wiper arms are stationary.

From the foregoing description of the principal parts of the windshield wiper operating mechanism of the present invention, it will be apparent that the apparatus is simple and may be easily and conveniently used. In installing the apparatus in an automobile, it is merely necessary to attach the mounting plate 22 at any suitable place behind the instrument panel in either a vertical or horizontal position. The actuator rods 11 and 12 are then connected to the wiper arms and one end of the flexible drive shaft 53 is suitably connected to a source of power such, for example, as the generator shaft, fan shaft, or fan belt of the car.

Means is provided for readily changing the angle of the drive shaft 37 with respect to the crank shaft 19 and thus to change the zone of contact between the driving body 28 and the portion 61 of the wheel 21 and permit selective contact of the wheel 21 with the driving body, the idling wheel 42, or the parking wheel 41. Such means comprises a shaft 68 one end of which may extend through the instrument panel of the automobile and is preferably provided with a suitable knob or handle (not shown). The other end of the shaft 68 is rotatably secured in the mounting plate 22. There is also provided on the mounting plate 22 around the shaft 68 an indexing plate 69 having a plurality of notches 70 equi-distantly spaced on the upper face thereof adjacent its periphery. Mounted on the shaft 68 above the indexing plate 69 are a pulley 72 and a resilient arm 73. The free end of the latter is bent to form a finger 74 shaped to engage the notches 70 on the plate 69 and serve as a detent. To prevent relative rotation of the pulley 72 and arm 73 on the shaft 68, the shaft, as shown in Figures 1 and 2, is preferably provided with a squared portion 75 which passes through holes of similar size and shape in the pulley and arm.

Rotary motion of the shaft 68 is transmitted to the stub shaft 33, by which the bracket 32 is mounted for oscillation, by a flexible element 77 such as a cord or wire that passes around the pulley 72 and is attached at each end to one of the rods or arms 78 which project in radial alignment from the shaft 33. Stop pins 79 provided on the plate 22 at suitable points are adapted to engage the rods or arms 78 to limit the rotary movement of the shaft 33 and the bracket 32 and thus define the arc within which the bracket and the driving body 28 supported therein may be oscillated by rotation of the shaft 68. The finger 74 of the detent arm 73 engages the notches 70 sufficiently firmly as to hold the bracket 32 in adjusted position. Nevertheless, the shaft 68 may be easily turned against the resistance of the detent to shift the position of the bracket as and when desired.

It will be understood that the mechanism of the present invention may be modified and that considerable variation from the construction shown and described above may be secured within the scope of the invention. Thus by appropriate modification the mechanism may be adapted for operation of only one or several windshield wipers and such wipers may be used on trucks, airplanes, locomotives or other vehicles or even on glass or other surfaces in buildings or on machines.

If desired the driving body 28 may be mounted differently in the bracket 32 in which event it may be unnecessary to form the arm 39 of the bracket 32 in two parts with the lap joint 82 secured by screws 83 and the bracket may be formed in one piece. Further, if desired, the body 28 may be solid instead of hollow and it and the idling wheel 42 may be covered with some material other than rubber to increase the friction between them and the wheel 21. In fact, the latter may be covered with rubber or other suitable material instead of the body 28 and wheel 42. Use of a frictional drive permits slipping of the drive if for any reason a wiper is held from moving and thus prevents breaking of parts.

While the shaft 68 is shown aligned with the crankshaft 19 it will be realized that this is not necessary as it may be mounted at any suitable place on the plate 22. Indeed, if desired, the control of the angular position of the bracket 32 may be located at any convenient point and even at a considerable distance from the bracket.

As will be seen from the foregoing the novel apparatus of the invention provides means for mechanical driving of windshield wipers and permits continuously variable adjustment of the wiper speed. Thus the wiper speed is not dependent on the speed of the engine or other power source but can be adjusted as required. The invention also provides means for selectively interrupting the wiper drive and for moving the wiper arms into predetermined (parked) position prior to interrupting the drive.

I claim:

1. In operating mechanism for windshield wipers, a rod adapted for operative connection to a windshield wiper arm and means for imparting a reciprocating movement to said rod, said means comprising a pair of rotatable elements, one of said elements being operatively connected to said rod and being adapted to be driven by the other of said elements, the other of said elements being adjustably mounted to permit the position thereof to be varied with respect to said driven element and being selectively movable to vary the speed of reciprocation of said rod, to interrupt movement of said rod, and to move said rod to a predetermined position before interrupting movement thereof, and means operatively connected to the other of said elements adapted for connection to a source of power.

2. In operating mechanism for windshield wipers, a rod adapted for operative connection to a windshield wiper arm and means for imparting a reciprocating movement to said rod, said means comprising a crankshaft, a crank arm carried by said crankshaft and pivotally connected to said rod, a wheel mounted on said crankshaft for rotation therewith, a substantially hemispherical driving body supported for rotation about its axis of symmetry, the surface of said driving body contacting the surface of said wheel, means operatively connected to said driving body to rotate it, said driving body being adjustable with respect to said wheel to vary the portion thereof with which said wheel is in contact thereby to permit continuous variation of the speed of said wheel and means rotating with said driving body and arranged to interrupt movement of said wheel and to move said wheel to a predetermined position before so interrupting movement of said wheel.

3. In operating mechanism for windshield wipers, a rod adapted for operative connection to a windshield wiper arm and means for imparting a reciprocating movement to said rod, said means comprising a bracket, a substantially hemispherical driving body supported in said bracket for rotation about the axis of symmetry of said hemispherical driving body, said bracket being supported for oscillation about an axis which is perpendicular to the rotational axis of said driving body and which lies in a diametrical plane of said driving body, a crankshaft having a wheel thereon contacting the surface of said driving body in a zone which includes said diametrical plane when said rotational axis is parallel to said crankshaft, a crank arm carried by said crankshaft and pivotally connected to said rod, a drive shaft operatively connected to said driving body, a parking wheel mounted on said drive shaft in axially spaced relation to said driving body for rotation therewith, means operatively connected to said drive shaft to rotate said driving body and said parking wheel, and means operative to oscillate said bracket selectively to engage said driving body and said parking wheel with said first mentioned wheel.

4. In operating mechanism for windshield wipers, a rod adapted for operative connection to a windshield wiper arm and means for imparting a reciprocating movement to said rod, said means comprising a bracket, a substantially hemispherical driving body supported in said bracket for rotation about the axis of symmetry of said hemispherical driving body, said bracket being supported for oscillation about an axis which is perpendicular to the rotational axis of said driving body and which lies in a diametrical plane of said driving body, a crankshaft having a wheel thereon having a peripheral portion contacting the surface of said driving body in a zone which includes said diametrical plane when said rotational axis is parallel to said crankshaft, a crank arm carried by said crankshaft and pivotally connected to said rod, a drive shaft operatively connected to said driving body, a parking wheel mounted on said drive shaft in axially spaced relation to said driving body for rotation therewith, said first mentioned wheel including a second portion having a groove in the periphery thereof, said parking wheel having a face adapted to engage the periphery of said second portion and to rotate said first mentioned wheel until said groove is reached, means operatively connected to said drive shaft to rotate said driving body and said parking wheel, and means operative to oscillate said bracket selectively to engage said driving body and said parking wheel with said first mentioned wheel.

5. In operating mechanism for windshield wipers, a rod adapted for operative connection to a windshield wiper arm and means for imparting a reciprocating movement to said rod, said means comprising a bracket, a substantially hemispherical driving body supported in said bracket for rotation about the axis of symmetry of said hemispherical driving body, said bracket being supported for oscillation about an axis which is perpendicular to the rotational axis of said driving body and which lies in a diametrical plane of said driving body, a crankshaft having a wheel thereon contacting the surface of said driving body in a zone which includes said diametrical plane when said rotational axis is parallel to said crankshaft, a crank arm carried by said crankshaft and pivotally connected to said rod, a parking wheel mounted in axially spaced relation to said driving body for rotation therewith, an idling wheel mounted between said driving body and said parking wheel and freely rotatable with respect thereto, means operatively connected to said parking wheel and said driving body for rotating them, and means operative to oscillate said bracket selectively to engage said driving body, said idling wheel and said parking wheel with said first mentioned wheel.

6. In operating mechanism for windshield wipers, a rod adapted for operative connection to a windshield wiper arm and means for imparting a reciprocating movement to said rod, said means comprising a rotatable driving body, said body having a substantially hemispherical outer surface and being supported in a bracket for rotation about an axis extending through the center of said surface, said bracket being supported for oscillation about an axis which is perpendicular to the rotational axis of said driving body and lies in a diametrical plane of said driving body, a crankshaft adjacent said driving body and having a wheel thereon contacting the surface of said driving body in a zone which includes said diametrical plane when said rotational axis is parallel to said crankshaft, said crankshaft also having a crank arm pivotally connected to said rod, a drive shaft operatively connected to said driving body, a parking wheel mounted on said drive shaft in axially spaced relation to said driving body for rotation therewith, an idling wheel rotatably carried on said drive shaft between said driving body and said parking wheel, means operatively connected to said drive shaft to rotate said shaft, and means operative to oscillate said bracket selectively to engage said driving body, said idling wheel and said parking wheel with said first mentioned wheel.

References Cited in the file of this patent

UNITED STATES PATENTS

| 1,193,448 | Ashton et al. | Aug. 1, 1916 |
| 1,759,239 | Morrison | May 20, 1930 |
| 2,232,480 | Schmid | Feb. 18, 1941 |

FOREIGN PATENTS

| 128,229 | Australia | July 6, 1948 |